Patented May 11, 1926.

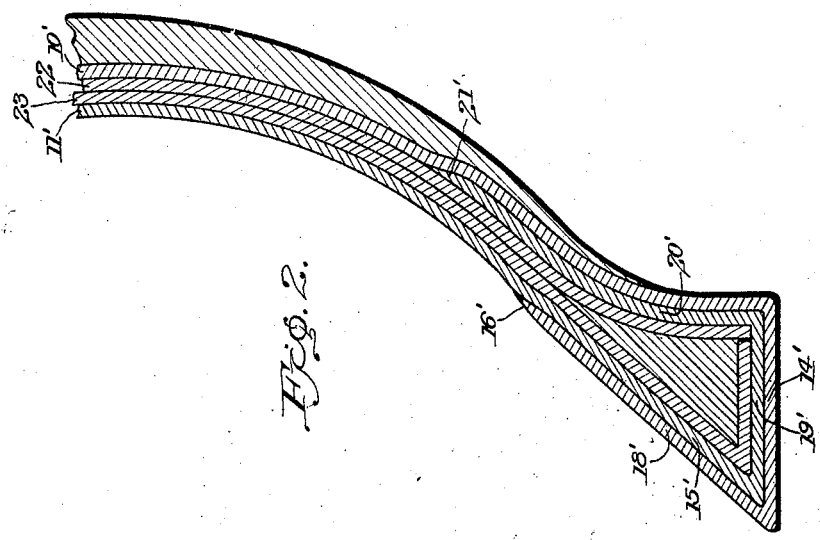
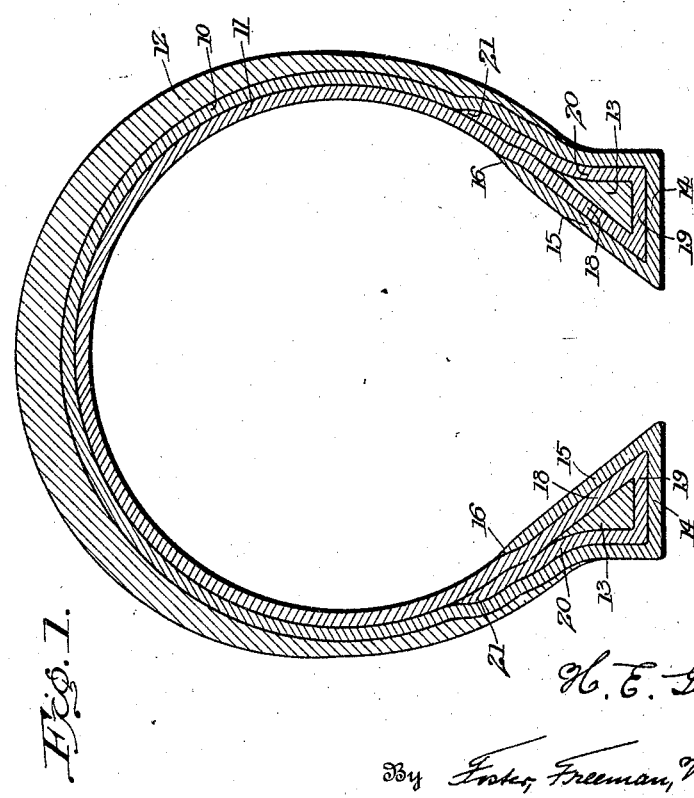

1,584,284

UNITED STATES PATENT OFFICE.

HANS E. GRABAU, OF NEW YORK, N. Y., ASSIGNOR, BY MESNE ASSIGNMENTS, TO ALFRED A. GLIDDEN, OF WATERTOWN, MASSACHUSETTS.

TIRE CASING.

Application filed November 4, 1919. Serial No. 335,575.

The present invention relates to pneumatic tires and more particularly to the construction of the casing around the beads.

One of the points of weakness of pneumatic tires as constructed today is adjacent the beads of the tire. This weakness is due to the fact that the layers of strain resisting material of the casing are not anchored to the beads with sufficient security to hold them against displacement. Often one layer of strain resisting material will become loosened from the bead thereby throwing the entire strain on the remaining layers and soon rupturing or breaking them. Again, the side walls of many of the tires adjacent the beads are not sufficiently stiff, with the result that there is considerable flexing adjacent the beads resulting in rim cuts and blow-outs.

It is the object of the present invention to eliminate the defects mentioned above. To this end the layers of fabric are securely anchored to the beads and the side walls of the casing adjacent the beads are reinforced to stiffen them adjacent the beads so that the flexing occurs at a point removed from the beads. Other objects and features of novelty will be apparent from the description taken in connection with the drawings in which:

Figure 1 is a transverse sectional elevation of a pneumatic tire casing constructed in accordance with the present invention; and Figure 2 is an enlarged sectional elevation through a bead and a part of the side wall of a casing having a greater number of layers of strain resisting material than shown in Figure 1.

Referring to Figure 1 of the drawings, the tire there shown includes two layers 10 and 11 of strain resisting material, such as cords or fabric. The usual rubber tread 12 is disposed around the outer of these layers. The present invention consists in the arrangement of the layers around the beads and in the side walls. Referring to the drawing it will be seen that the outer layer 10 of the strain resisting material passes down on the outside of the beads 13 along the bottoms thereof as at 14, thence upward on the inside of the beads as at 15, terminating at a point 16 in the side walls above the beads.

The layer 11 of strain resisting material next to the outer layer 10 passes down on the inside of the beads as at 18, thence along the bottom thereof as at 19, and then upward on the outside of the beads as at 20 to a point 21 in the side walls above the beads. It will be observed that the two layers 10 and 11 extend around the beads in opposite directions and further that the terminating edges of one of these layers is higher up in the side walls than the other, thus stiffening the side walls gradually toward the beads so that the point of flexure is brought to a point in the side walls removed from adjacent the beads. The arrangement of layers around the beads just described provides positive anchoring of the layers to the beads it being practically impossible for one of the layers to pull away from a bead.

In Figure 2 a tire having a greater number of layers of strain resisting material is illustrated. As shown, the tire has four layers 10', 11', 22 and 23 of strain resisting material. The intermediate layers 22 and 23 are disposed around the beads 13 in any of the usual ways. Thus the layer 23 extends down on the inside of the beads and along the bottom terminating at one edge of the beads. The other intermediate layer 22 extends down on the outside of the beads terminating at a point adjacent the bottom thereof. It is to be understood, however, that the present invention is not limited to the particular disposition of these two layers at the beads. The inner layer 11' and outer layer 10' are disposed around the beads in the same manner as described in connection with Figure 1. Thus the outer layer 10' extends down on the outside of the beads along the bottom thereof as at 14' and up on the insides thereof as at 18' terminating at a point 16' in the side walls and above the beads. The interior layer 11' extends down on the inside of the beads as at 15' along the bottom thereof as at 19' and up on the outsides as at 20' to a point 21' in the side walls above the beads. It will be observed that the inner and outer layers of strain resisting material extend entirely around the beads, preferably in opposite directions and that the edges of the inner and outer layers terminate in the side walls of the beads, one of said layers extending farther up in the side walls than the other. The results and advantages of this structure are the same as explained in connection with Figure 1. It is to be noted that there are only three layers of material at the bottoms of the beads, although there are four layers in the casing. This construction permits a larger bead and at the same time the layers are securely anchored. Although Figure 2 illustrates a casing having four layers, it is to be understood that more or less may be employed, but in such case two of the layers, preferably the inner and outer, extend around the beads and up the side walls to points above the beads.

Although the invention has been described in detail it is to be understood that it is not thus limited but includes modifications and changes which come within the scope of the appended claims.

Having thus described the invention what is claimed as new and desired to be secured by Letters Patent is:

1. A pneumatic tire casing including beads and a plurality of layers of strain resisting material, two of said layers extending around each of the beads in opposite directions and up the side walls to points above the beads, thereby anchoring the layers and reinforcing the side walls adjacent the beads.

2. A pneumatic tire casing including beads and a plurality of layers of strain resisting material, the outer of said layers extending around the beads and up the side walls terminating at a point above the beads, and the inner layer also extending around the beads in the opposite direction to the outer layer and up the side walls terminating at a point above the beads, whereby the strain resisting material is securely anchored to the beads and the side walls of the tire reinforced.

3. A pneumatic tire casing including beads and a plurality of layers of strain resisting material, the outer of said layers extending down on the outside of the beads around the same and up on the inside to a point in the side walls above the beads, another layer extending down on the inside of the beads, around the same and up on the outside to a point in the side walls above the beads.

4. A pneumatic tire casing including beads and a plurality of main layers of strain resisting material, one of said layers extending down on the outside of the beads around the same and up on the inside to a point in the side walls above the beads, and the inner layer extending down on the inside of the beads, around the same and up on the outside to a point in the side walls above the beads, one of said layers terminating closer to the beads than the other.

In testimony whereof I affix my signature.

HANS E. GRABAU.